Nov. 26, 1935.　　　D. G. HALL, JR　　　2,022,344
AUTOMOBILE BODY CONSTRUCTION
Filed Aug. 22, 1934　　　4 Sheets-Sheet 1

Inventor
D. G. Hall, Jr.
By Clarence A. O'Brien
Attorney

Nov. 26, 1935.  D. G. HALL, JR  2,022,344
AUTOMOBILE BODY CONSTRUCTION
Filed Aug. 22, 1934    4 Sheets-Sheet 3

Inventor
D. G. Hall, Jr.
By Clarence A. O'Brien
Attorney

Nov. 26, 1935.  D. G. HALL, JR  2,022,344
AUTOMOBILE BODY CONSTRUCTION
Filed Aug. 22, 1934  4 Sheets-Sheet 4
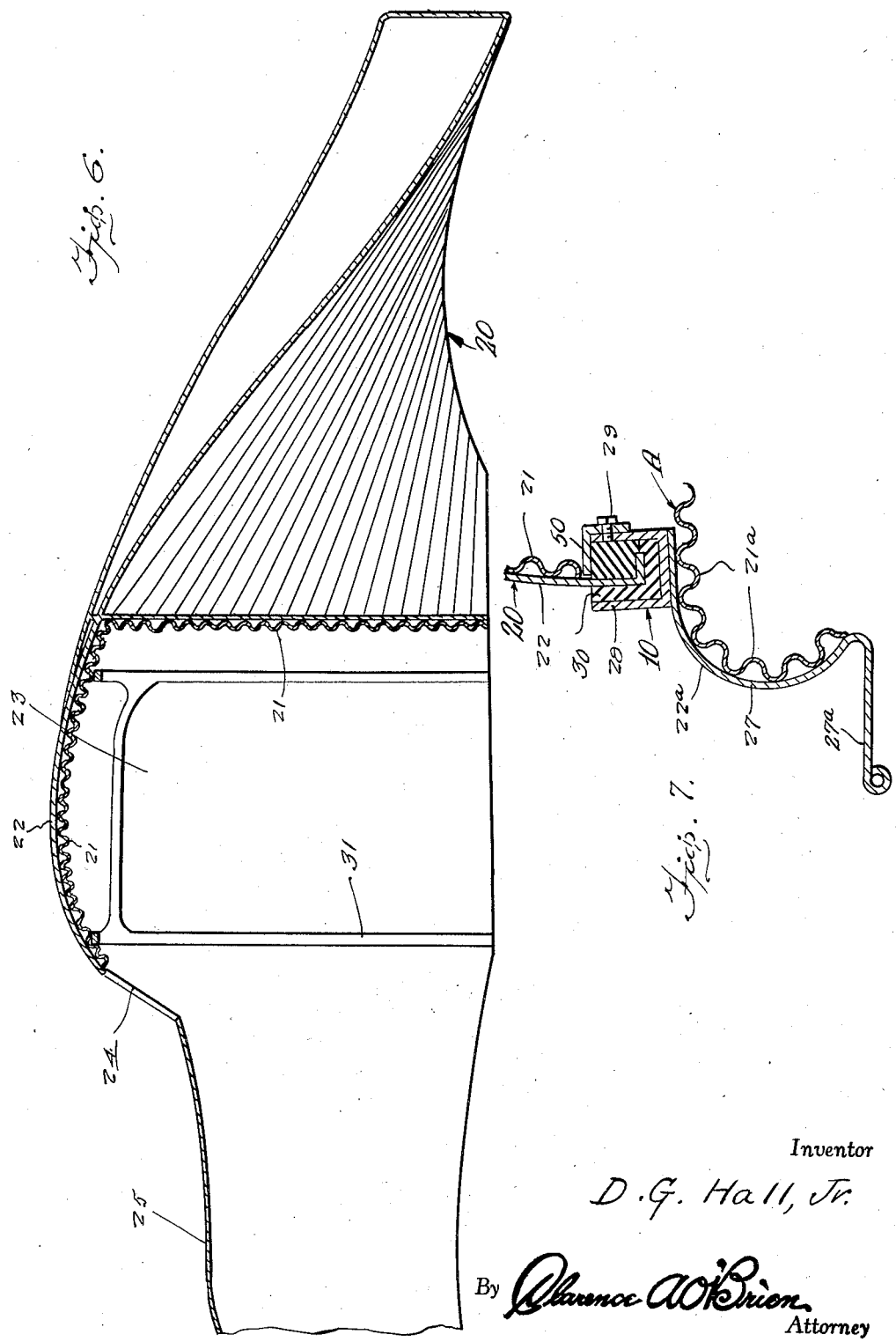
Inventor
D. G. Hall, Jr.
By Clarence A. O'Brien
Attorney Patented Nov. 26, 1935

2,022,344

UNITED STATES PATENT OFFICE 2,022,344

AUTOMOBILE BODY CONSTRUCTION

David Gordon Hall, Jr., San Diego, Calif.

Application August 22, 1934, Serial No. 740,996

2 Claims. (Cl. 296—28)

This invention relates broadly to motor driven vehicles and particularly to automobiles.

More specifically, the invention consists in an improved construction of automobile bodies that is readily adapted for obtaining the streamline effect now in vogue among designers of automobile bodies.

The invention, together with its objects and advantages, will be best understood from a study of the following description taken in connection with the accompanying drawings, wherein:

Figure 6 is a detail fragmentary longitudinal view through the body.

Figure 7 is a fragmentary detail view showing the manner of securing the body to the deck frame of the automobile.

Figure 8 is a fragmentary edge elevational view of the superimposed corrugated and flat pieces from which the body is made.

Figure 9 is a fragmentary plan view of the details shown in Figure 8.

Figure 1:
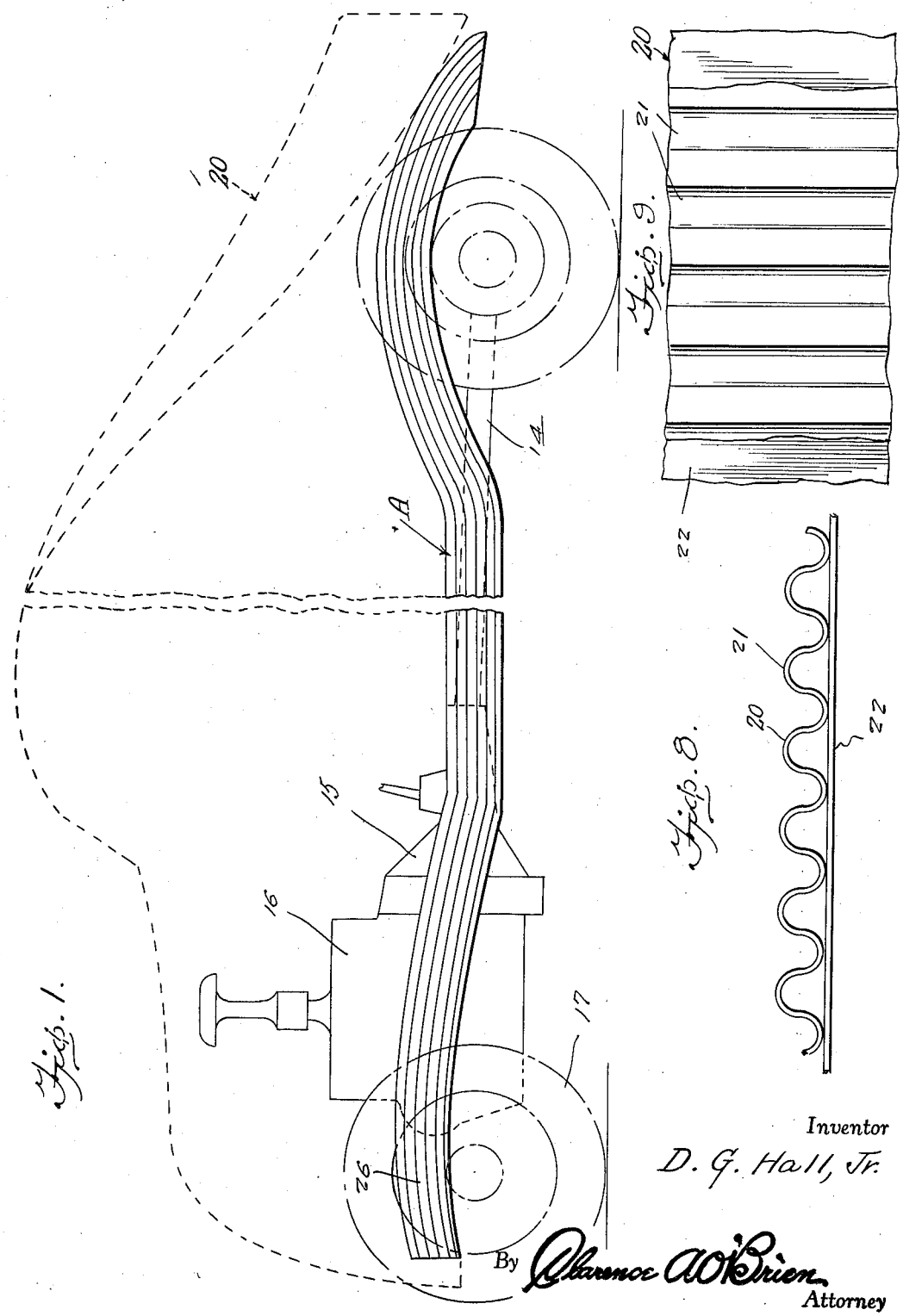
Figure 1 is a side elevational view of an automobile embodying the features of the present invention with the body in skeleton and the outer shell of the deck frame removed.

Referring to the drawings by reference numerals, it will be seen that in accordance with the present invention, the automobile, in the present instance a coupe type of automobile, is provided with a coupling frame indicated generally at 10, and the other essential parts of a motor driven vehicle, as for example, the rear driving wheels 11, rear axle 12, differential housing 13, propeller shaft housing 14, transmission 15, internal combustion engine 16, front steering wheels 17, front axle 18, and the usual steering mechanism 19.

The improved body is designated as a whole by the reference numeral 20 and consists of an inner shell 21 formed of a plurality of metallic plates welded or otherwise secured together and corrugated as shown. Disposed over and concealing the inner shell 21 is an outer shell 22 that is similarly formed of a plurality of metallic plates welded or otherwise united together but these plates are flat as distinguished from being corrugated. At all points of contact, the shells 21 and 22 are electrically welded or otherwise united.

Figure 2:
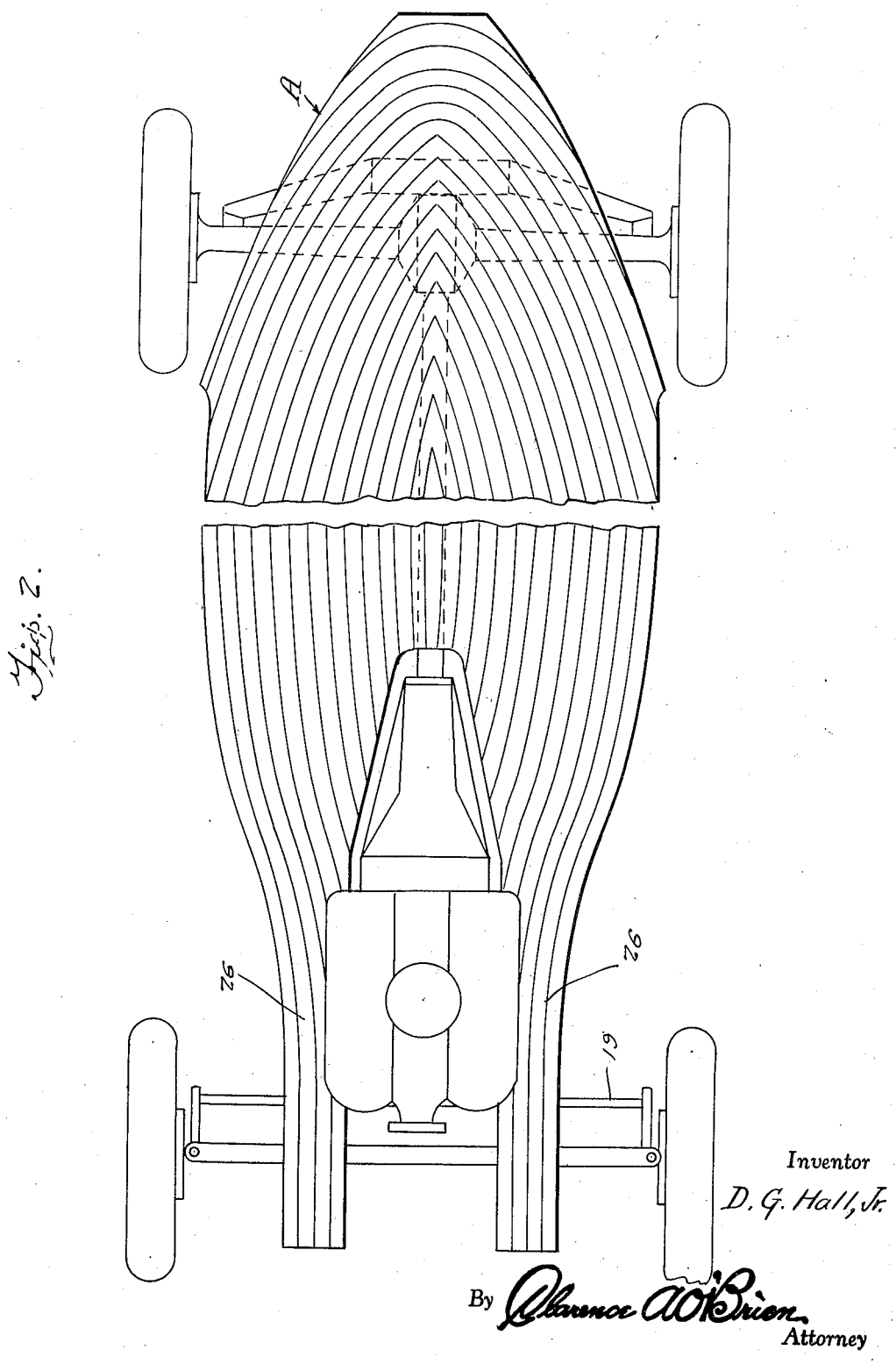
Figure 2 is a top plan view of the deck frame with the outer shell removed.
Figure 3:
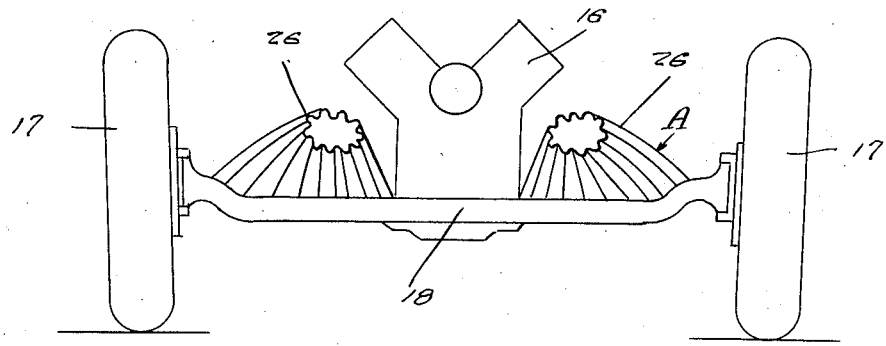
Figure 3 is a front end view of the automobile with the outer shell of the deck frame and the body removed.
Figure 4:
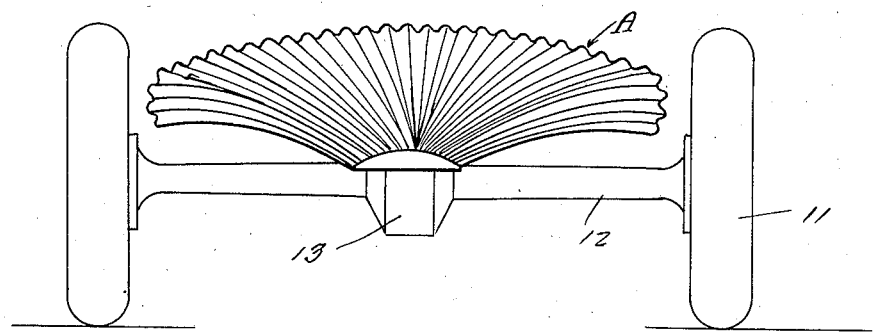
Figure 4 is a rear end view thereof with the outer shell of the deck frame and the body removed.

In the construction of the body, the shells 21 and 22 are now pressed to contour in all planes to provide a body of the desired shape, in the present instance, the shape being extremely streamlined, provision of course being made for the cabin 23 which will, of course, be provided with a windshield and windows as indicated generally at 24. Provision is also made to form a hood 25 and in this connection, it will be noted that the hood 25 is formed solely of the non-corrugated plates. The deck frame is indicated generally at A and has spaced extensions 26 extending forwardly constructed to accommodate the motor 16 between them. The deck frame A is constructed like the body with the exception that the shape of the completed deck frame is pressed into the shape or configuration shown in Figures 1 and 2. That is to say, the smooth metal plates of the outer shell 22a are welded to the crests of the corrugated plates of the inner shell 21a to form an inner and outer shell integral with each other.

Figure 5:
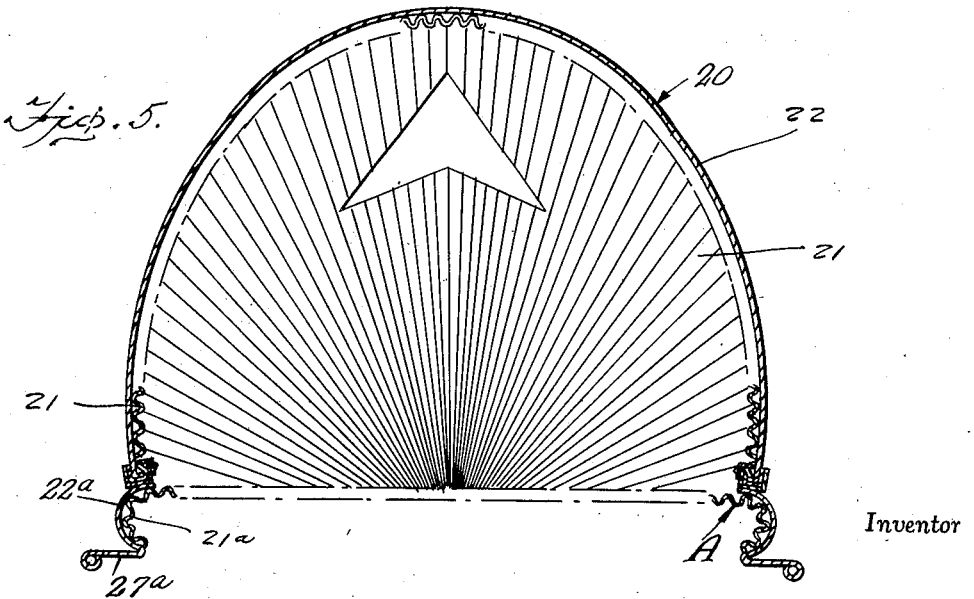
Figure 5 is a transverse sectional view through the body resting on the deck frame.

In the area of the deck frame A where the splash aprons 27 and running boards 27a are formed, the inner corrugated shell 21a and the outer smooth shell 22a are pressed to the customary shape forming the apron 27, and the running boards 27a. Where the running boards 27a merge with the bottom of the apron the inner corrugated shell terminates while the outer smooth shell 22a extends horizontally outwardly to form the running boards 27a, all of which will appear by an inspection of Figures 5 and 7 of the drawings.

The body 20 and the deck frame A are secured to the coupling frame in the following manner: The outer sections 22a of the deck frame or valances are secured as by electric welding or the like to web of channel members 28. The body proper has the outer shell 22 thereof extended beyond the edges of the inner shell 21 and the edges of the outer shell 22 are embedded in rubber 30 filling the channels of the channel bars 28 as clearly shown in Figure 7. Thus the bar 28 and the rubber 30 forms a seam between the body proper 20 and the deck frame A, and the rubber filling is anchored by one leg 50 of an angle bar. The other leg 51 of the angle bar is bolted as at 29 to the side of the channel bar 28.

If desired, the cabin part 23 of the body 22 may be strengthened or reinforced by a suitable skeleton frame structure 31 as suggested in Figure 6.

An automobile body embodying the features of the present invention will have numerous advantages over the types of automobile body constructions now generally used. In accordance with the present invention, the body is composed essentially of two sections or shells 21 and 22. Each of these sections or shells are to be formed by proper presses in essentially two operations. In the first operation, the hot or annealed plates are impressed with the corrugations. These corrugations are so designed that they will adapt themselves to the predetermined scheme of construction and will be in such a position as to afford maximum rigidity to the style of body under construction. The shells are then each pressed to the desired contour in all planes so that when placed one upon the other in the proper manner they may be welded together forming a single piece having the general characteristics of a longitudinally corrugated tube, and adapted for use as an automobile body having the predetermined contour most adaptable for the style of body intended.

Because of the unbroken external surface formed by the shell 22, a body construction of this type is ideally adapted to the construction of streamline vehicles, presenting minimum air resistance and turbulence. Further, because of the lightness in weight of the body, the designer may place the center of gravity where it will be possible to obtain the greatest road stability without at the same time increasing the weight of the automobile.

Further, because of the lack of necessity of internal bracing and therefore thin apparent thickness, it is possible to obtain with this type of construction maximum interior dimensions with minimum exterior dimensions. Also, owing to the self-contained bracing and other features of strength and of self-support of this type of body construction, a sub-frame for a body made of this material is unnecessary. Likewise, the shape of the body is obtained and retained without the use of a contour structure or subframe as is now required where rigidity, strength and self-support is sought after in automobile body constructions.

Also, a body of this character will have minimum vibration and reverberations as generally give rise to the body noises and drumming characteristic of the present types of automobile body constructions.

A body construction of this character will also be a great safety factor while at the same time allowing for extreme streamline contours.

The type of seam construction herein described and clearly shown in Figure 7 permits the body to be held evenly along its entire length and not merely at some few points as is the case where bolting of the body to the chassis frame is resorted to and as is the present practice. Further the use of rubber involved in the construction forming the seam between the body member and the apron, and also constituting the connection between the body and the chassis frame prevents frictional noises between the body and frame and also prevents the transmission of unavoidable chassis noises to the body.

What is claimed is:

1. A unitary automobile construction comprising a body formed entirely of an outer smooth shell and an inner corrugated shell jointed together and shaped into a body configuration, a deck frame formed of an outer smooth shell and an inner corrugated shell joined together and shaped into a deck frame, a coupling frame secured to the outer smooth shell of the deck frame, a portion of the smooth shell of the body extending beyond the inner corrugated shell and secured to the coupling frame whereby the body and deck frame are joined together.

2. A unitary automobile construction comprising a body formed entirely of an outer smooth shell and an inner corrugated shell joined together and shaped into a body configuration, a deck frame formed of an outer smooth shell and an inner corrugated shell joined together and shaped into a deck frame, a coupling frame secured to the outer smooth shell of the deck frame, a portion of the smooth shell of the body extending beyond the inner corrugated shell and secured to the coupling frame whereby the body and deck frame are joined together, and a portion of the outer smooth shell of the deck frame extended beyond the corrugated inner shell to form running boards on the opposite sides of the automobile.

DAVID GORDON HALL, Jr.